United States Patent [19]

Skaja et al.

[11] 4,251,982
[45] Feb. 24, 1981

[54] GRASS BAGGER

[76] Inventors: Patrick Skaja, c/o George Spector, 3615 Woolworth Bldg., 233 Broadway; George Spector, 3615 Woolworth Bldg., 233 Broadway, both of, New York, N.Y. 10007

[21] Appl. No.: 48,717

[22] Filed: Jun. 15, 1979

[51] Int. Cl.³ .............................................. A01D 35/22
[52] U.S. Cl. ......................................... 56/202; 56/16.6
[58] Field of Search ......... 56/16.6, 202, 199, 203–207, 56/320.2

[56] References Cited

U.S. PATENT DOCUMENTS

| 3,099,123 | 7/1963 | Price | 56/202 |
|---|---|---|---|
| 3,133,396 | 5/1964 | Leader | 56/202 |
| 3,199,277 | 8/1965 | Moody | 56/16.6 |
| 3,568,421 | 3/1971 | Smith et al. | 56/202 |
| 3,618,157 | 11/1971 | Bassin | 56/202 |
| 3,805,500 | 4/1974 | Sweet | 56/16.6 |
| 3,874,152 | 4/1975 | Dahl | 56/202 |
| 3,916,608 | 11/1975 | Garrison | 56/202 |
| 3,925,968 | 12/1975 | Waganhals | 56/16.6 |
| 4,014,406 | 4/1977 | Witt et al. | 56/202 |

Primary Examiner—Paul J. Hirsch

[57] ABSTRACT

A grass catching accessory attachable on a rotary power lawn mower, the device including a basket in which a plastic bag trash can liner is placed, the bag mouth being fitted around a tubular mouthpiece secured fixedly to the mower and through which grass clippings are discharged, the basket being pivotally attached to a spout pivoted on said mouthpiece, so to dump a filled bag.

4 Claims, 3 Drawing Figures

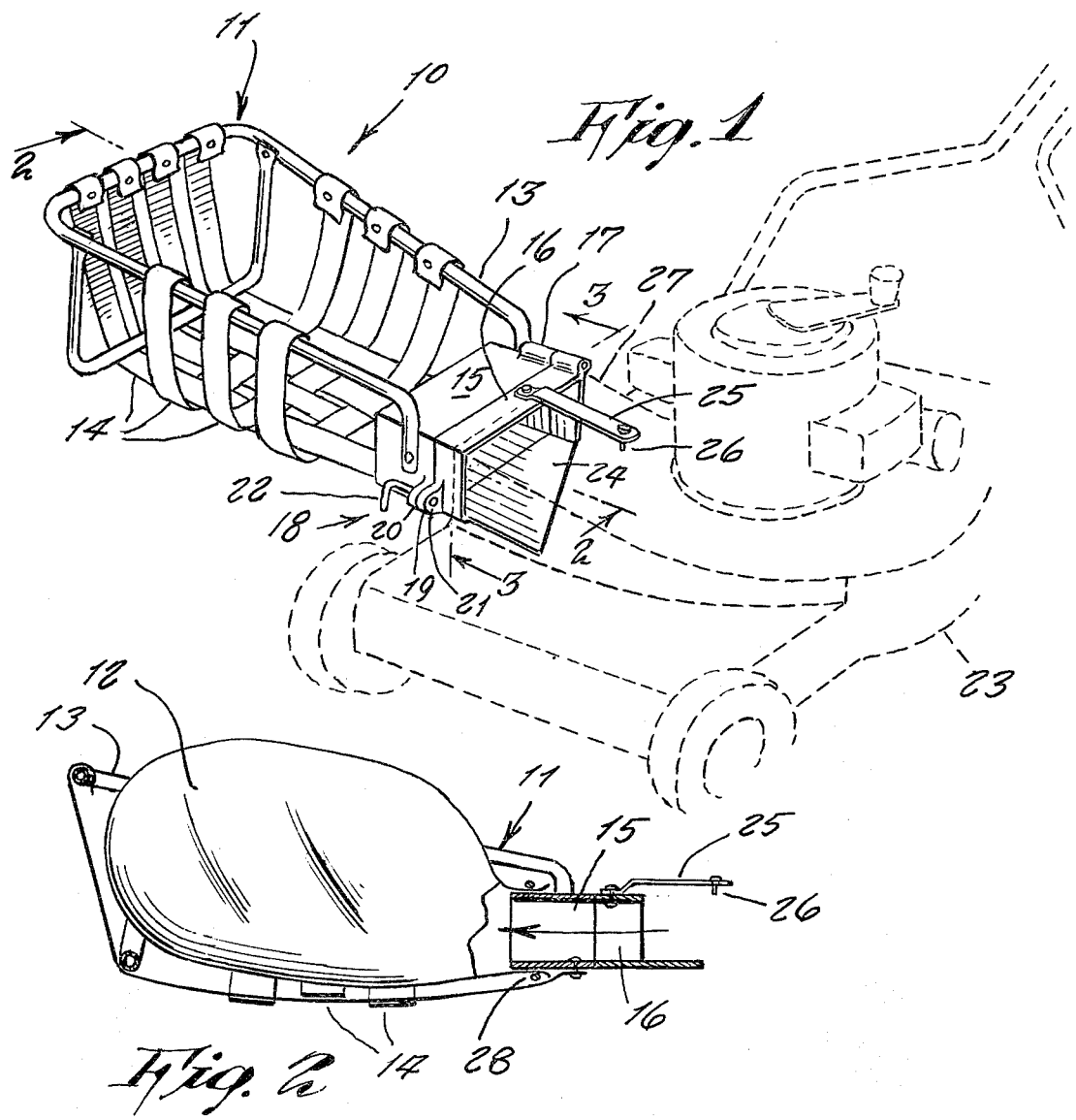
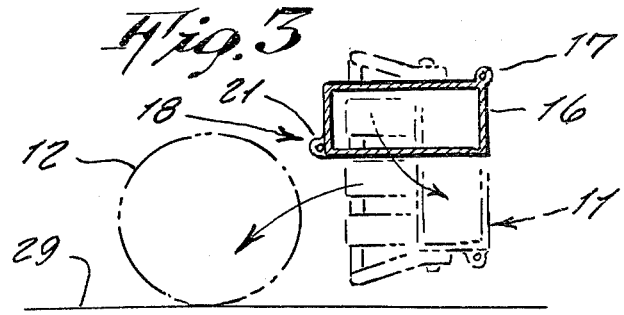

GRASS BAGGER

This invention relates generally to grass clipping catchers for lawn-mowers.

Heretofore grass clipping catcher devices have been marketed for attachment to a lawnmower and which necessitated dumping the clippings from the catcher into a trash can. This extra chore, after cutting a lawn, is objectionable and is therefore in want of an improvement.

Therefore it is a principal object of the present invention to provide a grass bagger whereby the clippings are thrown by the mower directly into a disposable bag which is then simply removed from the mower after becoming filled, and the bag is then placed for pick up by a trash collector, without need of clipping transfer.

Another object is to provide a grass bagger which drops a filled bag downwardly so to not necessitate lifting a filled bag out of a basket in which it is supported upon the mower.

FIG. 1 is a perspective view of the invention shown mounted on a rotary power lawn mower, and the invention shown including an easy unloading means for a grass filled bag.

FIG. 2 is a cross sectional view on line 2—2 of FIG. 1.

FIG. 3 is a cross sectional view on line 3—3 of FIG. 1, showing the bag rolling out, when a pin is pulled, so to cause the grass bagger to pivot down and allow the bag fall out, without need of lifting it, so to be easier for women, older persons or others.

Referring now to the drawing in detail, the reference numeral 10 represents a grass bagger according to the present invention wherein the same includes a basket 11 within which is placed a disposable plastic bag 12 such as is used as a trash can liner.

The basket is made of a frame 13 made of light weight tubular aluminum and a plurality of flexible straps 14 woven together in crossing fashion and the strap ends being snapped around the frame. The frame is rigidly fastened to a tubular, box-shaped, metal spout 15.

The spout 15 is pivotally attached to a similarly sized and shaped, metal mouthpiece 16 adjacent thereto, by means of a hinge 17 at one upper corner of thereof, and the mouthpiece and spout are retained aligned together by means of a lock 18 at a diagonally opposite corner thereof, so that in use, grass clippings pass through both. The lock comprises a lug 19 on the mouthpiece and a lug 20 on the spout being adjacent together so that a hole 21 through each are aligned for receiving a pin 22.

The mouthpiece is stationarily mounted upon a lawn mower 23, and includes a lip 24 which is inserted inside the grass clipping discharge outlet thereof. A metal band 25 connected to a top of the mouthpiece carries a screw 26 which is engaged in a hole that is drilled in a top cover plate 27 of the mower.

In operative use the bag is placed in the basket while the bag mouth is fitted around the spout and is secured thereto either by snap attachments or else by other means such as an elastic band 28 that wraps around the bag mouth and spout.

After the bag gets filled up with clippings, a person then unsnaps the bag mouth from around the spout, and then pulls out the pin 22, thus causing the basket to freely pivot around the hinge, and tip downward, as shown by the dotted lines in FIG. 3, so to cause the filled bag to roll out of the basket and upon a ground 29, thus eliminate need of lifting the heavy bag upward out of the basket.

What is claimed:

1. A grass bagger comprising the combination of a basket support having a spout secured at one end, a mouthpiece means pivotally securing said mouthpiece to said spout along an axis parallel to the longitudinal axis of said spout whereby said spout can be pivoted from an operative position aligned with said mouthpiece to an unloading position wherein the spout and basket are rotated towards the ground with said basket support generally in a vertical position, said mouthpiece including means for removably mounting said mouthpiece on the outlet of a lawnmower, including means for retaining said spout in said operating position.

2. A bagger as in claim 1 wherein said securing means is a hinge connecting the spout and mouthpiece along an edge thereof eccentric of the longitudinal axis.

3. A bagger as in claim 2 wherein said mounting means is a peripheral edge which fits snugly into the said outlet and including a retaining bar connecting the mouthpiece and said outlet.

4. A bagger as in claim 3 wherein said hinge is along an upper outer edge, said retaining means is a movable retaining pin mounted on the mouthpiece and spout.

* * * * *